(12) United States Patent
Elman et al.

(10) Patent No.: US 7,260,195 B1
(45) Date of Patent: Aug. 21, 2007

(54) CALL MANAGEMENT SERVICE

(75) Inventors: Boris S. Elman, Newton, MA (US); Jesse Hefter, Brookline, MA (US)

(73) Assignee: Verizon Laboratories Inc., Waltham, MA (US)

( * ) Notice: Subject to any disclaimer, the term of this patent is extended or adjusted under 35 U.S.C. 154(b) by 51 days.

(21) Appl. No.: 10/007,958

(22) Filed: Nov. 13, 2001

(51) Int. Cl.
*H04M 15/00* (2006.01)

(52) U.S. Cl. .................. 379/126; 379/116; 379/121.05; 379/114.03

(58) Field of Classification Search ........... 379/114.01, 379/114.03, 114.05, 114.1, 114.12, 114.28, 379/115.01, 116, 119, 121.02, 121.05, 126, 379/127.01, 127.05, 121.03; 455/405, 406, 455/407, 408; 705/52, 60, 67, 68, 72, 2, 705/34

See application file for complete search history.

(56) References Cited

U.S. PATENT DOCUMENTS

| | | | | |
|---|---|---|---|---|
| 5,311,572 A | * | 5/1994 | Friedes et al. | ......... 379/211.02 |
| 5,544,229 A | * | 8/1996 | Creswell et al. | ....... 379/114.05 |
| 5,729,598 A | * | 3/1998 | Kay | ...................... 379/114.29 |
| 5,771,282 A | * | 6/1998 | Friedes | ................... 379/121.03 |
| 5,835,856 A | * | 11/1998 | Patel | .......................... 455/406 |
| 5,884,284 A | * | 3/1999 | Peters et al. | ................... 705/30 |
| 5,898,918 A | * | 4/1999 | Leppanen | ................ 455/414.1 |
| 5,915,006 A | | 6/1999 | Jagadish et al. | |
| 5,943,406 A | * | 8/1999 | Leta et al. | ................... 379/120 |
| 5,982,864 A | * | 11/1999 | Jagadish et al. | ............. 379/120 |
| 5,987,108 A | * | 11/1999 | Jagadish et al. | ........ 379/114.01 |
| 6,023,280 A | * | 2/2000 | Becker et al. | .............. 345/440 |
| 6,058,170 A | | 5/2000 | Jagadish et al. | |
| 6,173,046 B1 | | 1/2001 | Jagadish et al. | |
| 6,256,515 B1 | * | 7/2001 | Cox et al. | .................... 455/565 |
| 6,266,401 B1 | * | 7/2001 | Marchbanks et al. | ....... 379/116 |
| 6,282,274 B1 | * | 8/2001 | Jain et al. | .............. 379/114.26 |
| 6,459,779 B2 | * | 10/2002 | Wardin et al. | ......... 379/112.01 |
| 6,680,740 B2 | * | 1/2004 | Krueger | ...................... 345/601 |
| 6,728,355 B2 | * | 4/2004 | Kowalski | ............... 379/142.06 |
| 6,836,763 B1 | * | 12/2004 | Munsil et al. | ................. 705/34 |

* cited by examiner

*Primary Examiner*—Quoc Tran

(57) ABSTRACT

A system and method that enables a telecommunications consumer to define groups to be included in a monthly bill, and then periodically generate a bill in accordance with the consumer's specifications. In one embodiment, the invention includes a plurality of portable wireless telephone stations; a plurality of wired telephone stations; a plurality of local exchange carriers (LECs); at least one mobile switching center (MSC) and at least one mobile base antenna tower. Each MSC, LEC and IXC is adapted to operate a program that allows a telecommunications consumer to define groups to be included in a monthly bill, and then periodically generate a bill in accordance with the consumer's specifications.

12 Claims, 7 Drawing Sheets

| Source Telephone Number | Destination Telephone Number | Captured Prefix/ Postfix Characters | Cost | Duration |
|---|---|---|---|---|
| 412 | 514 | 416 | 522 | 524 |
| • | • | • | • | • |
| • | • | • | • | • |
| • | • | • | • | • |

CALL MANAGEMENT SERVICE

TECHNICAL FIELD

The invention relates to the field of telecommunications, and more specifically to a system and method for customizing the telephone billing process.

BACKGROUND

Telephone bill summary information is useful for a variety of purposes. For example, bill summary information may be used to automatically debit accounts for payment, to distribute charges to those who incurred them, and for cost tracking and reduction. Conventional telephone bills provide standard summary information, such as the location of a placed call and the total charges due over a predetermined period of time. The customer who receives the bill has no control over the summary information presented on the bill and cannot define or request custom summary information to appear on the bill. Recipients of such bills must themselves generate the summary information they need. It would be useful if bills including the desired customer defined or requested summary information were automatically generated by the telephone billing process.

More specifically, U.S. Pat. No. 5,982,864 entitled "Telephone Billing with Customized Billing Information," and U.S. Pat. No. 6,058,170 entitled "Telephone Billing with Summary Information," to Jagadish et al. disclose the capability to present billing information to a user in a user-specified form, subject to specific limitations. Patents describe the nature of the accumulated summary information for a particular customer as depending on the services subscribed to by that customer. For example, the patents provide that it may be useful to maintain a summary field containing the number of minutes of calls that the customer has made during a particular discount period.

Accordingly, there is a need for a system and method that enables a telecommunications consumer to dynamically arrange incoming and outgoing calls prior to the completion of the call into user-specified groups. There is also a need for a system and method that allows a telecommunications user to interactively create and organize groups in a master account by project, person, organization, purpose, etc.

SUMMARY OF THE INVENTION

The present invention satisfies the above-described need by providing a system and method that enables a telecommunications consumer to define groups to be included in a monthly bill, and then periodically generate a bill in accordance with the consumer's specifications. In one embodiment, the invention includes a plurality of portable wireless telephone stations; a plurality of wired telephone stations; a plurality of local exchange carriers (LECs); at least one mobile switching center (MSC); and at least one mobile base antenna tower. Each MSC, LEC and IXC is adapted to operate a program that allows a telecommunications consumer to define groups to be included in a monthly bill, and then periodically generate a bill organized by one or more of the groups in accordance with the consumer's specifications. In operation, when a telecommunications consumer establishes an account with a telecommunication service provider, the consumer is permitted to establish a plurality of groups for organizing the telephone calls made on the account. At regular intervals (e.g., monthly), a bill is generated in which telephone calls made on the account are organized by one or more of the groups in accordance with the consumer's specifications. When issued, it is envisioned that the bill may be presented to the user in any format specified by the user (e.g., paper, electronic, etc.)

It is understood that both the foregoing general description and the following detailed description are exemplary and explanatory and are intended to provide further explanation of the invention as claimed.

BRIEF DESCRIPTION OF THE DRAWINGS

FIG. 5 is a block diagram of a transaction database in accordance with one embodiment of the present invention;

DETAILED DESCRIPTION

Figure 1:
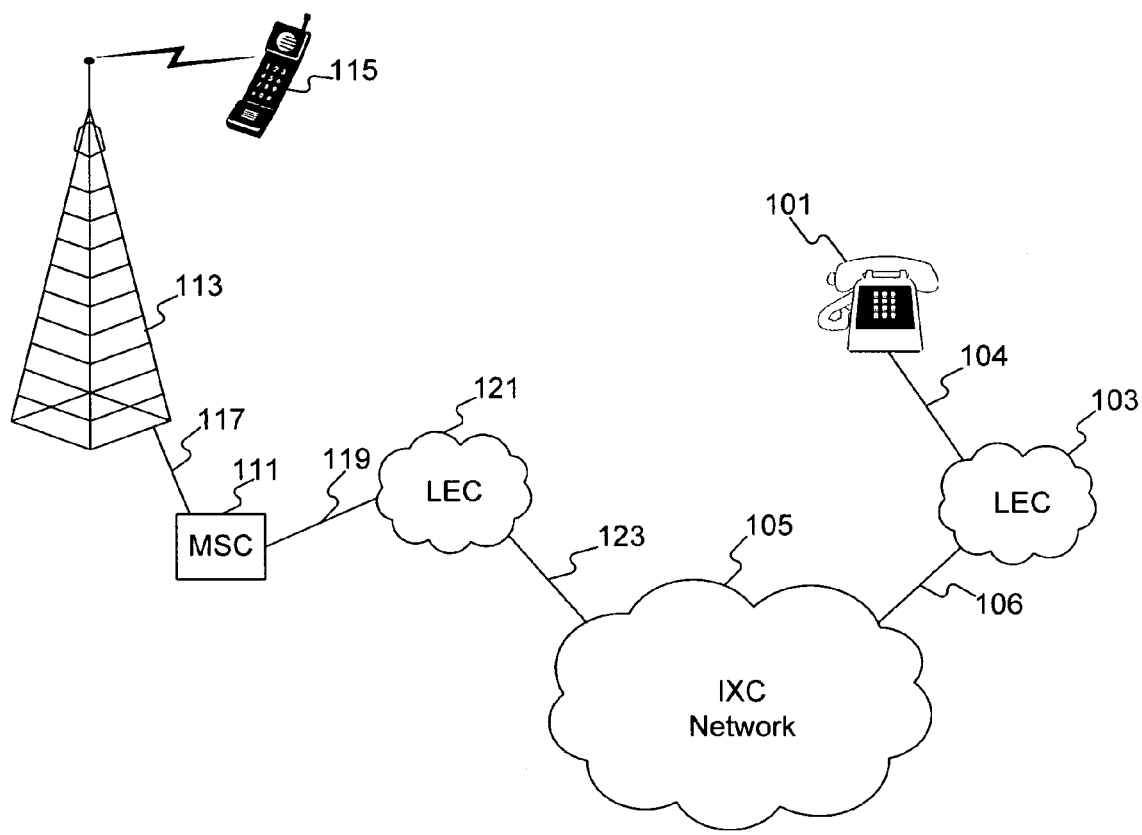
FIG. 1 is a network diagram of a telecommunications network in which a system consistent with the present invention may be implemented.

In the following detailed description reference is made to the accompanying drawings which show embodiments consistent with the invention. The embodiments are described in sufficient detail to enable those skilled in the art to practice the invention, and it is to be understood that other embodiments may be utilized and that structural changes may be made without departing from the scope of the present invention. The following detailed description is, therefore, not to be taken in a limited sense.

A telecommunications network in accordance with principles of the present invention includes a plurality of portable wireless telephone stations; a plurality of wired telephone stations; a plurality of local exchange carriers (LECs); at least one mobile switching center (MSC); and a mobile base antenna tower. Each MSC, LEC and IXC is adapted to operate a program that allows a telecommunications consumer to define groups to be included in a monthly bill, and then periodically generate a bill organized by one or more of the groups in accordance with the consumer's specifications. In operation, when a telecommunications consumer establishes an account with a telecommunications service provider, the consumer is permitted to establish and manage a plurality of groups for organizing the telephone calls made on the account. In a manner consistent with the principles of the present invention a bill is generated on regular intervals. Telephone calls made on the account are organized in the bill by one or more of the groups in accordance with the consumer's specifications.

Turning to the nomenclature of the specification, the detailed description which follows is represented largely in terms of processes and symbolic representations of operations performed by conventional computer components, including a central processing unit (CPU), memory storage devices for the CPU, and connected display devices. These operations include the manipulation of data bits by the CPU and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. that are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawings, in which like numerals represent like elements throughout the several figures, the present invention will be described.

FIG. 1 is an overview of a telecommunications system 10 that enables a telecommunications consumer to define groups to be included in a monthly bill, and then periodically generate a bill in accordance with the consumer's specifications. System 10 includes a wired telephone station 101, a plurality of local exchange carriers (LECs) 103 and 121, an interexchange carrier (IXC) network 105, a mobile switching center (MSC) 111, a mobile base antenna tower 113, and a wireless telephone station 115. As shown in FIG. 1, wired telephone station 101 is connected to LEC 103 via telephone line 104. Wired telephone station 101 is depicted as a handset, although other configurations may be used, including computers and interactive voice units, without departing from the spirit and scope of the present invention. LEC 103 is in turn connected to IXC network 105 via a communication line 106. Wireless telephone station 115 communicates on system 10 over a wireless interface with mobile base antenna tower 113. Tower 113 is connected to MSC 111 via communication line 117. MSC 111 is connected to LEC 121 via high capacity telephone line 119, which in turn is connected to IXC network 105 through high capacity communication line 123. LECs 103 and 121 are shown as separate networks, but may be the same network. LEC 103 is coupled to a single wired telephone station 101, and LEC 121 is coupled to a single MSC 111. However, LECs 103 and 121 may be coupled to multiple wired or wireless telephone stations and they may be coupled to a combination of wired telephone stations and wireless telephone stations without departing from the spirit and scope of the present invention. IXC network 105 is employed to establish connections from a first local exchange to a second local exchange. While not shown in FIG. 1, IXC network 105 may also be coupled to a plurality of interconnected user terminals and microprocessors (not shown) hosting a plurality of operating systems via large-scale computer network.

Figure 2:
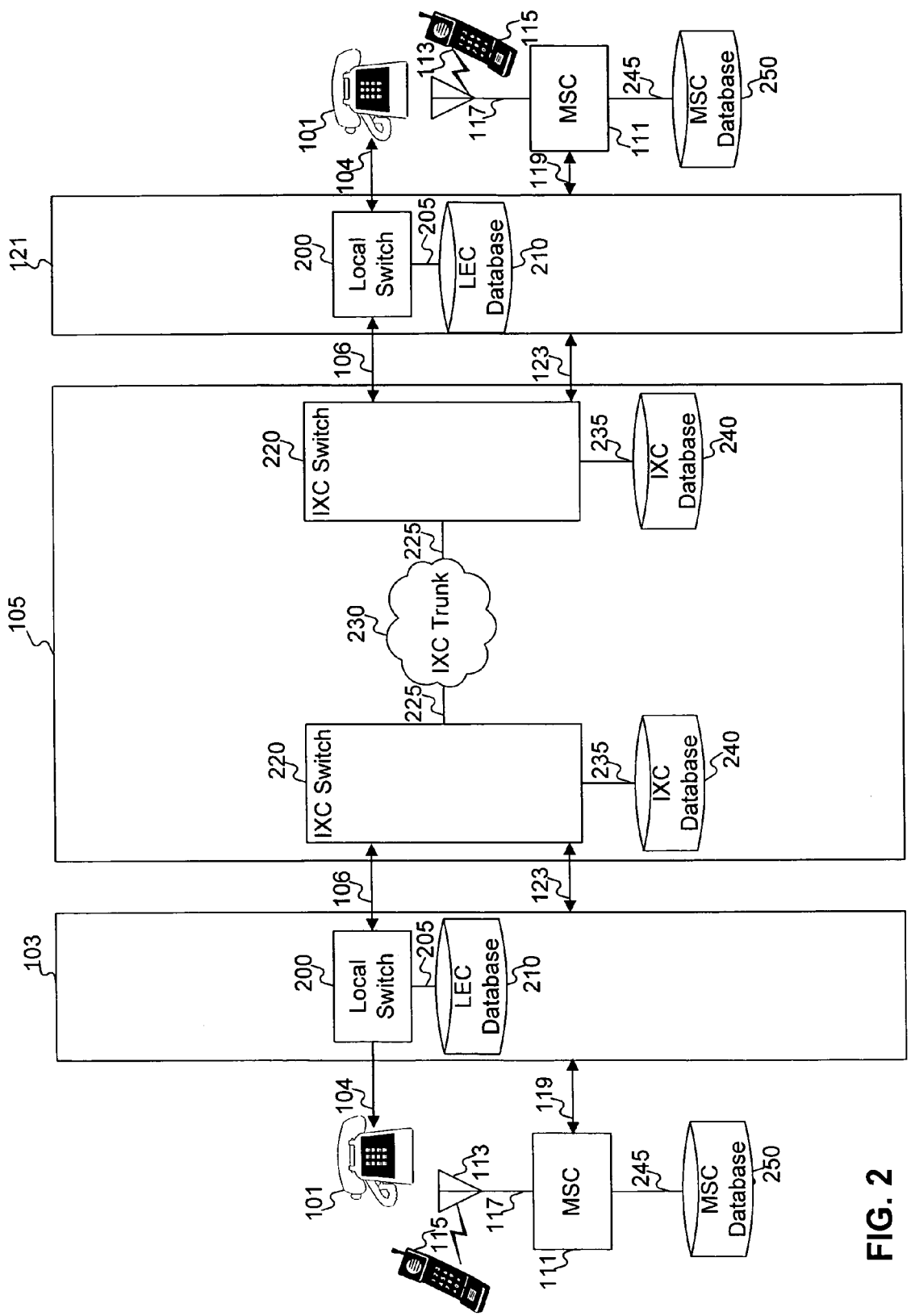
FIG. 2 is a detailed block diagram of the telecommunications network of FIG. 1.

Referring now to FIG. 2, there is shown a more detailed representation of the interface between IXC network 105, MSC 111, and LECs 103 and 121 in accordance with one embodiment of the present invention. IXC network 105 is comprised of at least one IXC switch 220 and at least one IXC trunk 230. IXC switch 220 is linked to IXC trunk 230 along a high capacity interface 225, which allows IXC network 105 to route telephone calls from a source IXC switch 220 to a destination IXC switch 220 (if required). IXC switch 220 is also coupled to IXC database 240 along bus interface 235. When a call is placed on system 10, IXC switch 220 retrieves caller source/destination information from LEC 103/121, and billing information generated by a rating system (not shown) from IXC database 240. At the completion of the call, IXC switch 220 then transmits charges and identifying information associated with the recently completed telephone call over interface 235 to IXC database 240 for storage and eventual retrieval by a customer billing system (not shown). As described below, charges and identifying information may be stored in other locations without departing from the spirit and scope of the present invention.

FIG. 2 additionally reveals that LECs 103 and 121 are comprised of at least one local switch 200. Local switch 200 communicates with IXC network 105 over high capacity communication line 106. Local switch 200 is also coupled to LEC database 210 along bus interface 205. In operation, local switch 200 accesses LEC database 210 to identify telephone numbers of wired telephone stations 101 connected to switch 200. A call initiated by a subscriber on a wired telephone station 101 travels to local switch 200 and then may proceed to at least one IXC switch 220 before reaching a destination telephone. When local switch 200 receives a request to transmit a telephone call, it accesses LEC database 210, determines the desired destination, and then routes the call to the proper location. Upon completion of the telephone call, LEC database 210 may store the source/destination information and charges associated with the call for eventual retrieval by a customer billing system (not shown).

FIG. 2 also shows that MSC 111 communicates with IXC network 105 over high capacity line 119. MSC 111 is also coupled to MSC database 250 along bus interface 245. When a user at a wireless telephone station 115 places a call, MSC 111 retrieves caller source/destination and billing information generated by a rating system (not shown) from MSC database 250. At the completion of the call, MSC 111 then transmits charges and identifying information associated with the recently completed telephone call over interfaces 119 and 123 to IXC switch 220 for storage and eventual retrieval by a customer billing system (not shown). Charges and identifying information associated with recently completed telephone calls may alternatively be stored on MSC 111, local switch 200, or both.

Figure 3:
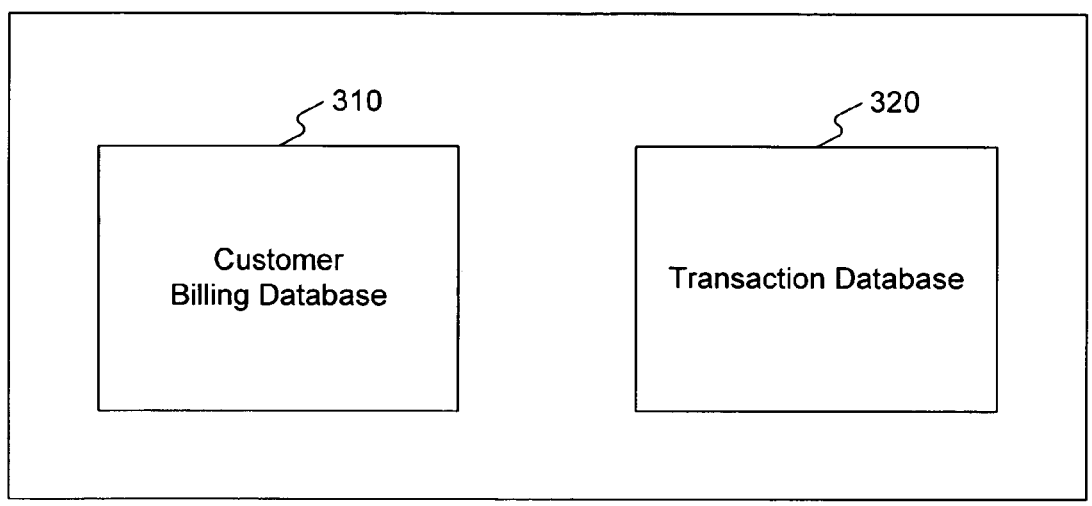
FIG. 3 is a block diagram of an Interexchange Carrier (IXC) Database in accordance with one embodiment of the present invention.

Referring now to FIG. 3, there is shown a detailed representation of the structure of IXC database 240 in accordance with one embodiment of the present invention. Database 240 is comprised of two separate databases: customer billing database 310 and transaction database 320. While customer billing database 310 and transaction database 320 are depicted as located in IXC database 240, it is important to note that they may instead be located in LEC database 210 or MSC database 250 without departing from the spirit and scope of the present invention. The present system may alternatively maintain duplicate copies of customer billing database 310 and transaction database 320 in IXC database 240, LEC database 210 and MSC database 250 without departing from the scope of the present invention. In operation, customer billing database 310 applies customer-specific billing parameters to each transaction to produce a processed call transaction record that is stored in transaction database 320 pending creation of a periodic customer billing statement. Although database 240 is shown as being comprised of two database components, those skilled in the art will recognize that other configurations may be consistent with the present invention.

Figure 4:
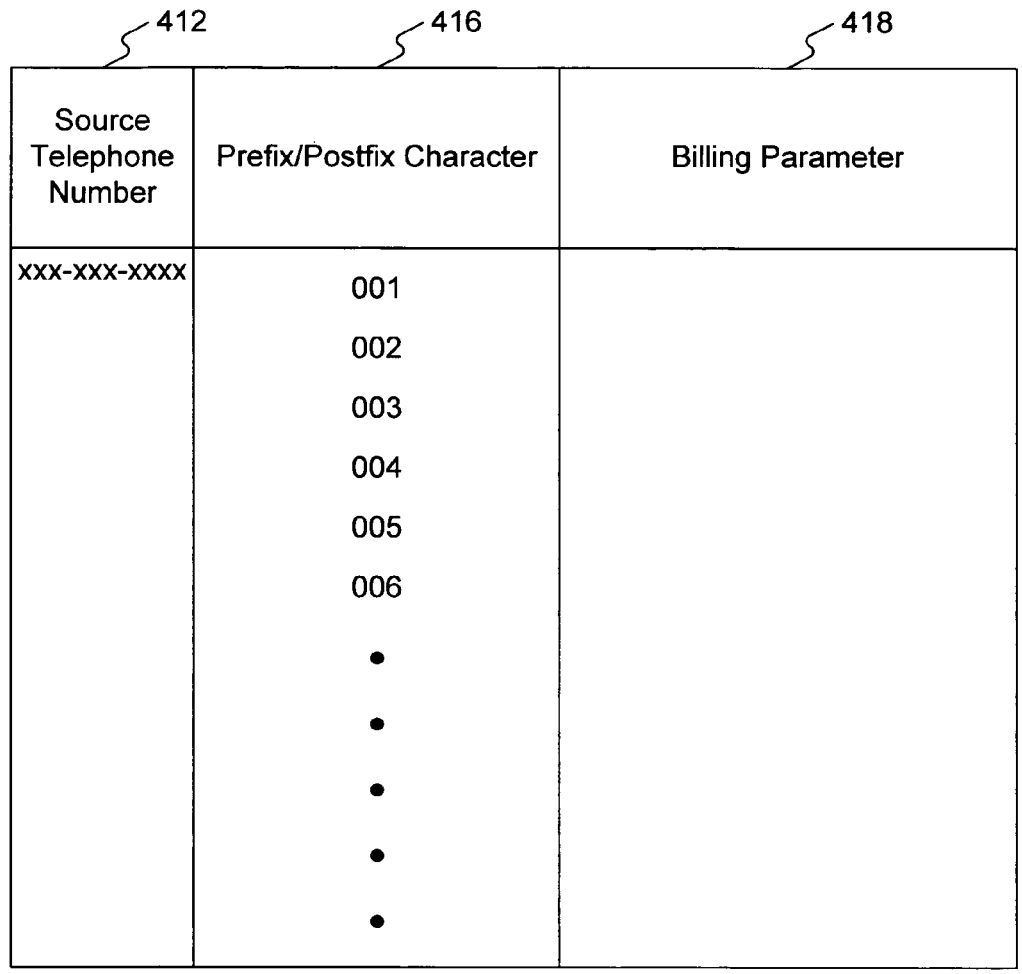
FIG. 4 is a block diagram of a customer billing database in accordance with one embodiment of the present invention.

Referring now to FIG. 4, each record of customer billing database 310 contains three fields: source telephone number 412, prefix/postfix reference combination 416, and billing parameters 418. Source telephone number 412 is the telephone number of the originator's telephone. Captured prefix/postfix reference combination 416 are (characters) data representative of signals that may be included before or after the dialed number to designate one or more billing parameters 418. The user may input the prefix/postfix reference combination 416 via the telephone keypad, or via voice control. Billing parameters 418 may specify a user ID, user discounts, source office, destination office, purpose of the call, and optional payment plans the user may wish to invoke in addition to, or instead of the provider's standard discounts. Billing parameters 418 may also indicate special routing instructions, alternate billing addresses, and other directions specified by a customer for processing periodic bills in accordance with the present invention. Billing parameters 418 may further include user-specified instructions for formatting the bill or organizing telephone calls on the bill. For example, one billing parameter 418 may indicate that a bill is to be organized by destination telephone number. Another billing parameter 418 may provide that telephone calls on a bill are organized by the individual placing the call. For example, many subscribers use a single communication line/master account for conducting business with multiple parties/customers. Methods and systems consistent with the present invention allow the subscriber to automatically organize telephone calls by the user who places the call regardless of the telephone used. In operation, when a user opens an account with a telecommunication service provider operating on system 10, the user is given access to customer billing database 310. At that time, the user may associate one or more billing parameters with each prefix/postfix reference combination 416. For example, the user may designate a user ID with each prefix/postfix reference combination. The user may also designate a different purpose for each prefix/postfix reference combination 416. In other words, the user may designate prefix/postfix reference sequence 001 as client development; 002 as engineering development, etc. The user may additionally designate multiple billing parameters with each prefix/postfix reference combination 416. That is, the user may designate prefix/postfix reference combination 001 as client development by John Doe; and 002 as client development by Jane Doe, etc. Once the user has completed the customer billing database designations, the present system is then adapted to generate a bill organized by one or more of the user-specified groups in accordance with the consumer's specifications. Subsequent to making the initial designations, the user may recurrently access customer billing database 310 through: a customer service representative, the Internet via a plurality of interconnected user terminals and microprocessors (not shown), an interactive voice unit, etc.

Transaction database 320 stores processed transaction records. As shown in FIG. 5, each record of transaction database 320 includes the source telephone number 412, destination telephone number 514, captured prefix/postfix reference combination 416, cost 522, and call duration 524. Source telephone number 412, destination telephone number 514 and captured prefix/postfix reference combination 416 are identical to the similarly-named fields in customer billing database 310 as explained above. Destination telephone number 514 is the desired destination of the originator's telephone call. Cost 522 is the charge computed for the telephone call based on the provider's standard discounts and any user-specified payment plans.

When a call traveling over telecommunications system 10 is terminated, IXS switch 220 uses customer billing database 310 to compute the cost of the call and then pass a record indicating the source, destination, captured prefix/postfix reference combination, and cost to transaction database 320. At a predetermined time, a bill is created for the customer. During the bill creation process, IXC network 105 uses the captured prefix/postfix reference combination to identify user-specified instructions for organizing the bill. Prior to delivering the bill to the customer, the present system may determine special routing instructions from the captured prefix/postfix reference combination to determine the ultimate destination of the bill.

Figure 6:
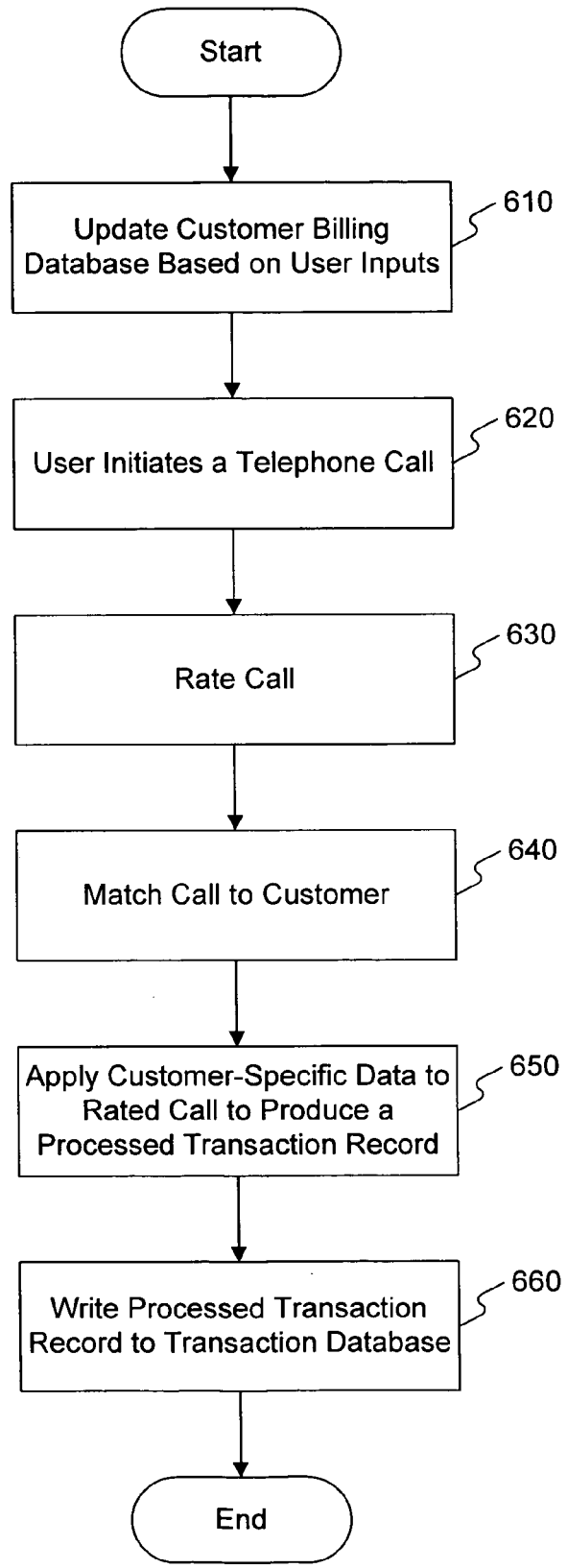
FIG. 6 is a detailed flow diagram depicting the process for creating a transaction record in accordance with one embodiment of the present invention.

Referring now to FIG. 6, there is shown a detailed flow diagram depicting the process for creating a transaction record to be stored in transaction database 320. As shown in step 610, the process begins when a user at a user terminal updates customer billing database 310 with user-specific account information. In one embodiment, a user is provided with information necessary to access customer billing database 310 when he/she opens an account with a telecommunication service provider operating on system 10. The summary information at a minimum, may designate prefix/postfix reference combination 416 associated with each source telephone number 412. As shown in FIG. 4, each prefix/postfix reference combination is further associated with a billing parameter 418. In one embodiment, the prefix/postfix reference combination 416 would be dialed in addition to the destination telephone number 514. The present system cross-references the prefix/postfix reference combination 416 to decode the user's desire with respect to a summarized billing statement. The prefix/postfix reference combination 416 may also be used as a shorthand code that instructs the present system to charge the call to a specific credit card account or third party. Once the user has established an account on customer billing database 310, processing flows to step 620 where a user at a wired telephone station 101 or a wireless telephone station 115 initiates a telephone call. Standard processing for the call involves procedures normally used to connect a caller at a source telephone station to destination telephone station. Before or after dialing the destination telephone number, the user may input a prefix/postfix reference combination to further instruct the present invention on how to process the telephone call. The process next flows to step 630 where the present system rates the telephone call. The present system then matches the rated call to the customer (step 640) so that customer specific parameters can be applied to the call. Several well-known techniques can be used to match the rated call to the customer. One such technique uses Automatic Number Identification (ANI). In an ANI system, the number of the telephone station from which a call is initiated is determined and used to identify the party who initiated the call. In the event the calling number is not recognized by the present system, or if the ANI feature is not available, the user may be further prompted to identify him/herself via an interactive voice unit, or Dual Tone Multi-Frequency (DTMF) input. The present system may also use prefix and postfix reference combinations to identify the calling party. This feature is particularly beneficial in cases where a single master account is used by a plurality of users. Accordingly, in step 650, the number of a telephone and its user may be determined and the call rated. Next, in step 660 the information is passed to the transaction database 320 (step 660) and processing terminates.

Figure 7:
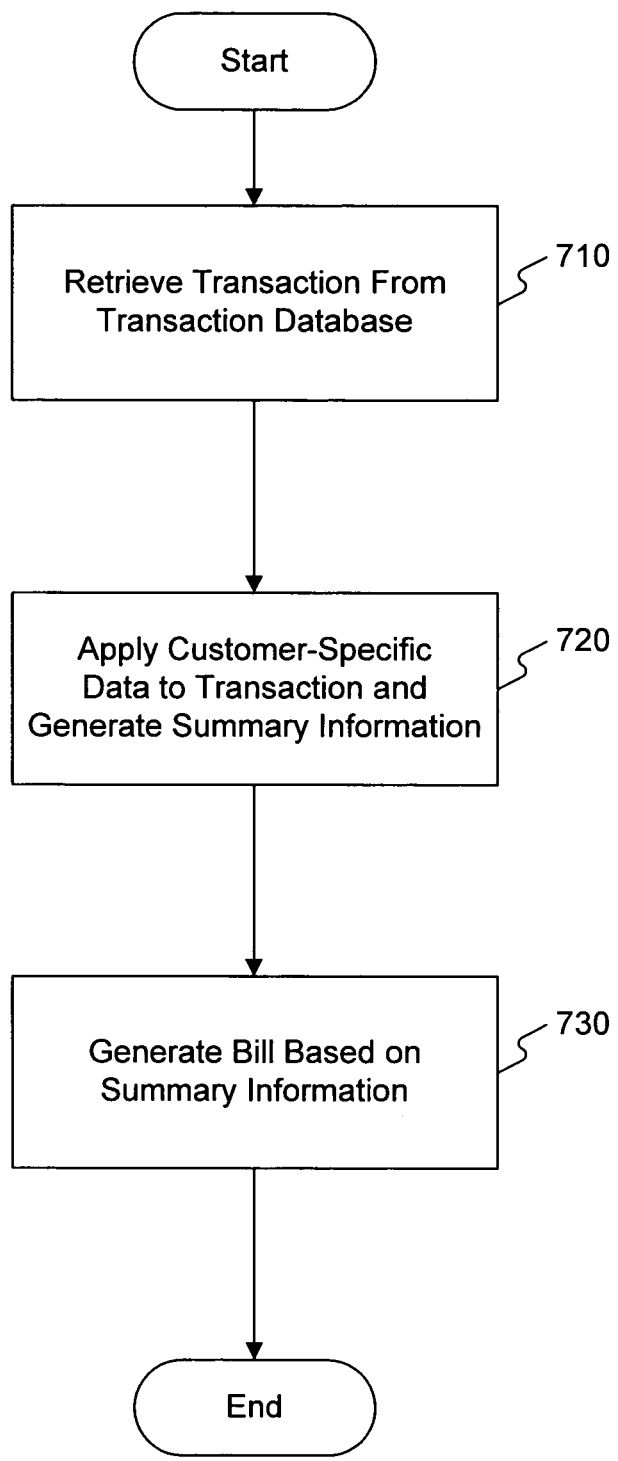
FIG. 7 is a detailed flow diagram depicting the process for generating a bill in accordance with one embodiment of the present invention.

Referring to FIG. 7, there is shown a detailed flow diagram of the process performed when the present invention generates a bill in accordance with one embodiment of the present invention. As shown in step 710, the process begins when the present system retrieves a transaction from transaction database 320. Next, the present system cross-references the source telephone number 412 contained in the transaction database record with the captured prefix/postfix reference combination 416. As previously stated, prefix/postfix reference combination 416 may include information necessary for billing the cost of the call, and information necessary for organizing calls to be placed on the billing statement. Once the information has been extracted from customer billing database 310, the present system then creates the billing statement (step 720). After the profiles have been applied, processing flows to step 730 where a user-specified summary bill is generated. In one embodiment of the present invention, the generated bill provides a graphical analysis (pie charts, bar charts, etc.) of account or group use (e.g., minutes of use; frequently called telephone numbers, frequency of outgoing calls from a particular telephone, etc.). The customer may further be given the opportunity through a user interface (not shown) to specify formats, contents, and periodicity of billing reports.

The present system may also operate a routine that monitors costs, total call duration, etc. associated with one or more accounts and groups, to provide alerts when certain thresholds are reached. For example, the present system can monitor total duration for each account or group as recorded in transaction database 320, and then notify a user, shutdown an account, etc. when an amount of time is exceeded. The present system may also monitor accrued cost for each account or group as recorded in transaction database 320, and then take appropriate actions when a dollar amount is exceeded.

From the foregoing description, it will be appreciated that the present invention provides a system and method that enables a telecommunications consumer to dynamically arrange incoming and outgoing calls prior to the completion of the call into user-specified groups. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; or other forms of RAM or ROM. Similarly, the method of the present invention may conveniently be implemented in program modules that are based upon the flowcharts in FIGS. 6-7. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems that may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for generating a telephone bill, comprising:
   collecting a transaction record from a database;
   extracting at least one prefix/postfix reference combination from said transaction record regardless of whether said combination is located before or after a dialed number, said prefix/postfix reference combination corresponding to at least one billing parameter; and
   generating a telephone bill organized by the at least one billing parameter without regard to a source telephone from which said prefix/postfix reference combination originates.

2. The method of claim 1, wherein the step of generating a telephone bill further comprises:
   receiving a request from a user to organize the bill in accordance with a user-specified format; and
   outputting the bill in accordance with the user-specified format.

3. The method of claim 2, wherein the user-specified format includes at least one pie chart.

4. The method of claim 2, wherein the user-specified format includes at least one bar chart.

5. The method of claim 1, wherein the step of extracting at least one prefix/postfix reference combination from said transaction record further includes the steps of:
   identifying a calling party associated with said prefix/postfix reference combination; and
   identifying at least one billing parameter associated with said prefix/postfix reference combination.

6. A method for generating a telephone bill, comprising:
   collecting a transaction record from a database;
   extracting a destination telephone number from said transaction record;

extracting at least one prefix/postfix reference combination from said transaction record regardless of whether said combination is located before or after a dialed number, said prefix/postfix reference combination corresponding to at least one billing parameter; and generating a telephone bill organized by the at least one billing parameter without regard to a source telephone from which said prefix/postfix reference combination originates.

7. The method of claim 6, wherein the step of extracting at least one prefix/postfix reference character combination from said transaction record further includes the steps of:

correlating the destination telephone number with a unique record in a customer billing database; and identifying at least one billing parameter associated with said prefix/postfix reference character combination.

8. A method for maintaining a telecommunication user account, comprising:

retrieving a customer billing database record for a user account, including at least one prefix/postfix reference combination;

retrieving said combination regardless of whether said combination is located before or after a dialed number; and modifying at least one entry in said record;

wherein a telephone bill is organized by a grouping of telephone calls defined within said record without regard to source telephones from which the telephone calls originate.

9. A computer-readable medium containing instructions for controlling at least one processor to perform a method for establishing a telecommunication user account, comprising:

collecting a transaction record from a database;

extracting at least one prefix/postfix reference combination from said transaction record regardless of whether said combination is located before or after a dialed number, said prefix/postfix reference combination corresponding to at least one billing parameter; and generating a telephone bill organized by the at least one billing parameter without regard to a source telephone from which said prefix/postfix reference combination originates.

10. The computer-readable medium of claim 9, further comprising the steps of:

identifying a calling party associated with said prefix/postfix reference combination; and identifying at least one billing parameter associated with said prefix/postfix reference combination.

11. A computer-readable medium containing instructions for controlling at least one processor to perform a method for establishing a telecommunication user account, comprising:

collecting a transaction record from a database;

extracting a destination telephone number from said transaction record;

extracting at least one prefix/postfix reference combination from said transaction record regardless of whether said combination is located before or after a dialed number, said prefix/postfix reference combination corresponding to at least one billing parameter; and generating a telephone bill organized by the at least one billing parameter without regard to a source telephone from which said prefix/postfix reference combination originates.

12. The computer-readable medium of claim 11, wherein the step of extracting at least one prefix/postfix reference character combination from said transaction record further includes the steps of:

correlating the destination telephone number with a unique record in a customer billing database; and identifying at least one billing parameter associated with said prefix/postfix reference character combination.

* * * * *